United States Patent [19]

Brill

[11] 4,197,048

[45] Apr. 8, 1980

[54] TRANSPORT APPARATUS

[76] Inventor: Roger Q. Brill, Rte. 4, Box 151, Mt. Carmel Rd., Cynthiana, Ky. 41031

[21] Appl. No.: 918,684

[22] Filed: Jun. 23, 1978

[51] Int. Cl.² .............................................. B60P 1/04
[52] U.S. Cl. ................................... 414/480; 414/537; 414/786
[58] Field of Search ............... 414/469, 471, 474, 477, 414/478, 480, 482, 537, 538, 786; 296/61

[56] References Cited
U.S. PATENT DOCUMENTS

| 3,066,816 | 12/1962 | Schwartz | 414/480 |
| 4,065,825 | 1/1978 | Cohen | 414/480 X |

Primary Examiner—Albert J. Makay
Attorney, Agent, or Firm—Frank C. Leach, Jr.

[57] ABSTRACT

A transport apparatus has a loading ramp pivotally connected to a lower frame, which is supported for transport along the ground. The ramp also is pivotally connected to an upper frame, which is disposed above the lower frame and connected thereto by linkage means. The vertical distance between the pivotal connections of the ramp to the lower frame and the upper frame, the horizontal distance between the pivotal connection of the ramp to the lower frame and the pivotal connection of the linkage means to the lower frame, the length of the linkage means between its pivotal connections to the upper and lower frames, and the horizontal distance between the pivotal connections of the linkage means to lower and upper frames are selected so that the horizontal force exerted at the pivotal connection of the ramp to the upper frame is greater than the horizontal force exerted at the pivotal connection of the linkage means to the upper frame when the ramp is in a ground engaging position to hold the ramp in this position until a load is driven up the ramp onto the upper frame. These various distances also are selected so that the ramp will remain in a transport position after the load has been advanced onto the upper frame.

13 Claims, 16 Drawing Figures

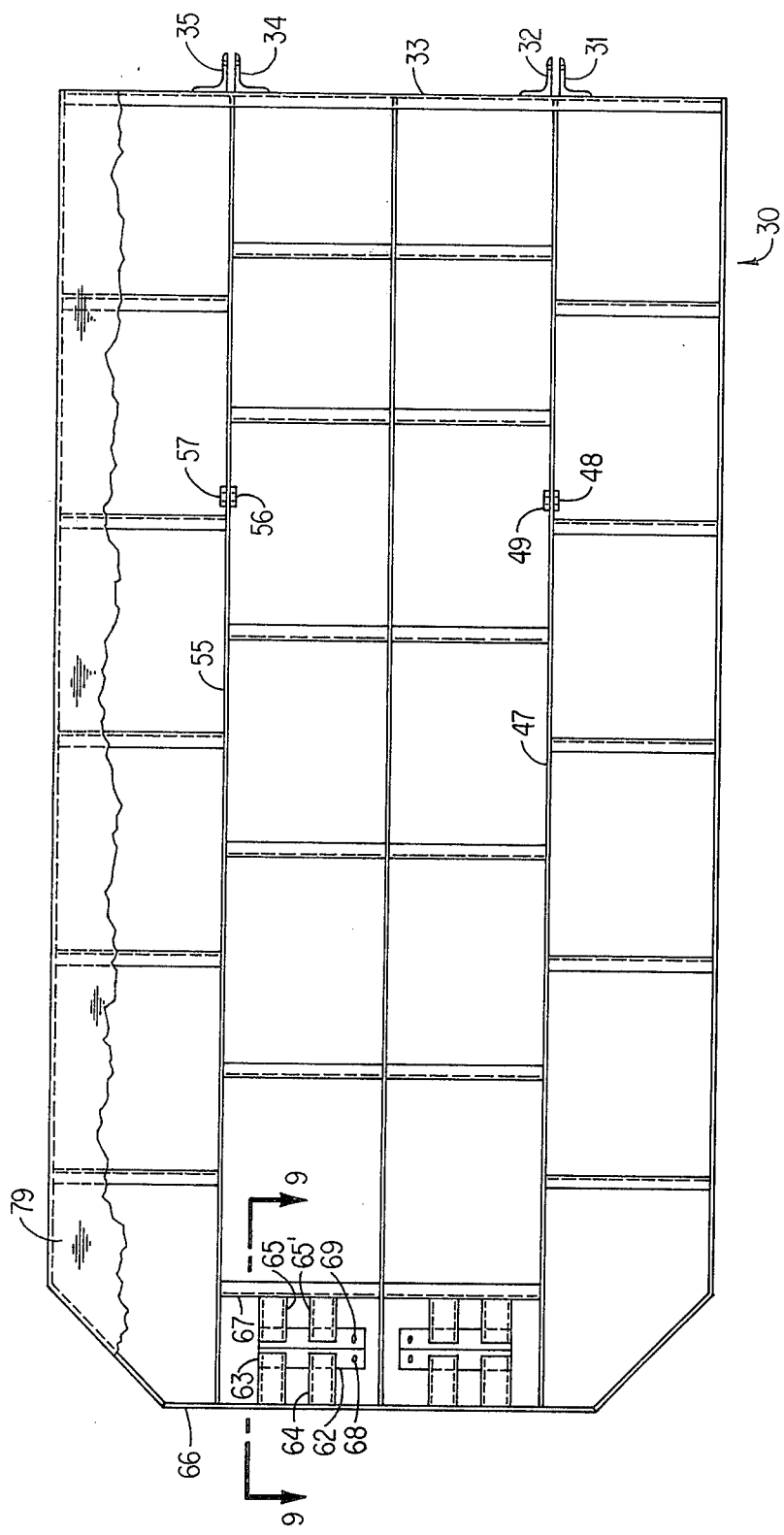

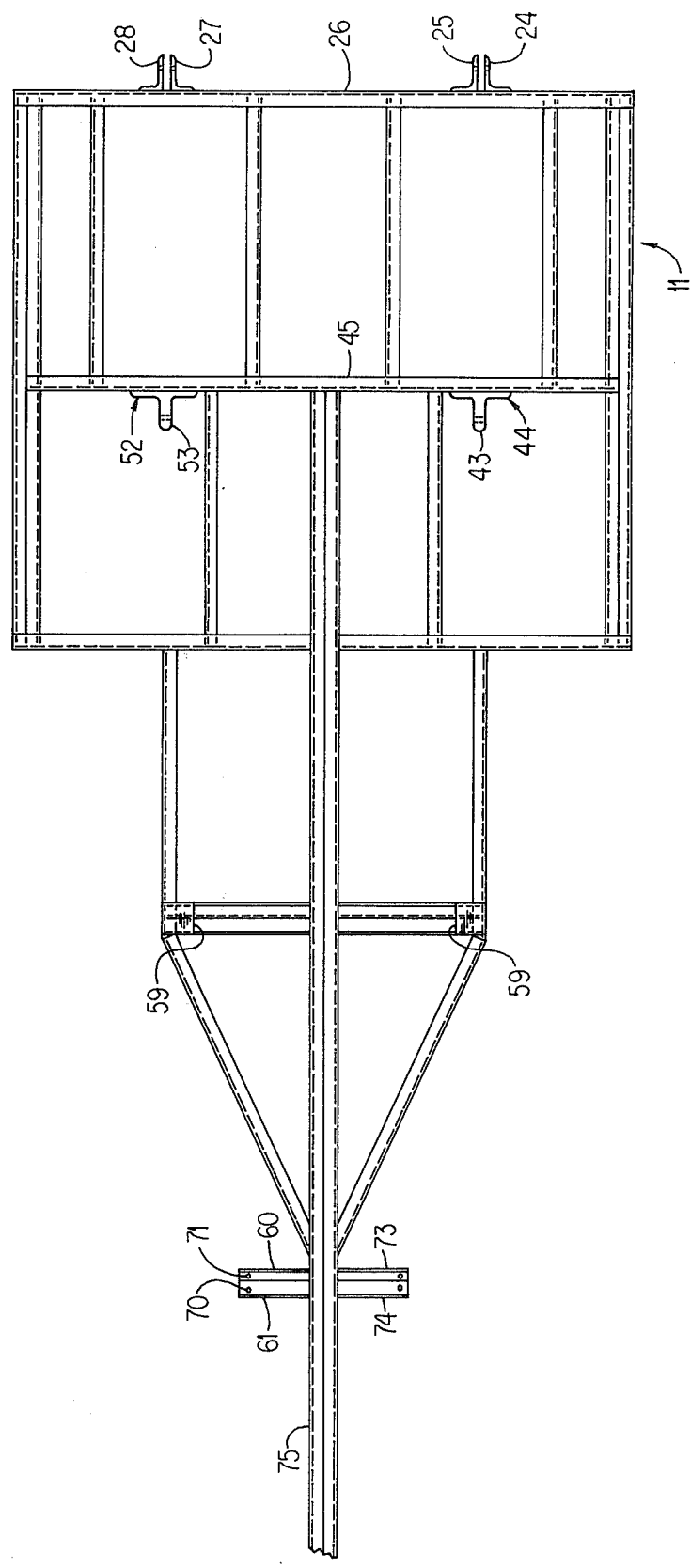

TRANSPORT APPARATUS

In the transport of vehicles, which are primarily non-highway vehicles or vehicles capable of operating at only relatively low speeds on a highway, from one location to another along a highway, it is desired to be able to transport the vehicle on a trailer or other transport apparatus in a minimum period of time at a minimum cost. For example, a farmer may have two farms and wish to transport his tractor from one farm to the other without having to drive the tractor on the highway because of the distance or the traffic, for example.

Various types of trailers for transport of non-highway vehicles have previously been utilized. One type of vehicle is shown in U.S. Pat. No. 3,584,754 to Moll wherein a trailer requires a hydraulic apparatus to move a loading ramp between its loading and transport positions. Thus, a source of hydraulic fluid must be provided. This not only increases the cost of the trailer but also increases the possibility of failure because of the relatively heavy loads to which the hydraulic system is subjected.

Another type of trailer for transporting non-highway vehicles is disclosed in U.S. Pat. No. 3,064,842 to Haynie wherein the trailer requires the axles of the wheels to be secured by pivotally connected arms so that the distance between the axles can vary when loading. It also requires activation of a winch to move the loading ramp into engagement with the ground.

A further type of trailer is illustrated in U.S. Pat. No. 2,452,681 to Rehberger. This trailer has a loading frame pivotally connected to its chassis frame and movable by means of a hydraulic system. This has the same disadvantages as the aforesaid Moll patent as well as being a complex mechanism.

U.S. Pat. No. 2,530,866 to Evans et al discloses a transportation assembly in which a vehicle is driven onto a floor of a frame due to certain legs of the frame being tilted. Thereafter, a mobile unit must be coupled to the frame to support the frame for transportation when the frame is connected to a towing vehicle. Thus, the addition of the mobile unit after loading has been completed appears to require at least two persons to mount the mobile unit on the frame. This is a relatively complex mechanism.

Accordingly, the previously available transport apparatuses have required a hydraulic arrangement or required more than one person to dispose the vehicle, which is to be transported, on the transport apparatus or have been a complex mechanism. The present invention satisfactorily solves the foregoing problems through providing a self-loading transport apparatus in which the load to be transported can be loaded on the apparatus or unloaded from the apparatus by a single person in a minimum period of time without any hydraulic system. Thus, the transport apparatus of the present invention has a relatively low cost and enables a single farmer, for example, to be able to move a tractor, for example, from one farm to the other without any additional help.

The present invention utilizes a loading ramp, which can be moved to its ground engaging position in which the load can be advanced from the ramp onto an upper frame of the transport vehicle, by a very small force on the end of the ramp. At the same time, the ramp cannot return from its ground engaging position to its transport position unless a small lifting force is applied to the end of the ramp when the transport apparatus is unloaded or a load is disposed on the upper frame. Therefore, the ramp remains in its ground engaging position until the load has been advanced to a position in which it exerts a sufficient force on the upper frame to cause the ramp to cease to engage the ground and move to its transport position. This can occur only after the vehicle, which is to be transported, has been advanced sufficiently forward along the upper frame.

While the upper frame can be held in the transport position with a load thereon by suitable retaining means, it should be understood that such is not necessary. Instead, by selecting the position and distances of various pivot points relative to each other, the ramp remains in the transport position until the load on the upper frame is moved from the upper frame to the ramp so that the ramp then returns to its ground engaging position in which the load can be unloaded.

An object of this invention is to provide a unique transport apparatus.

Another object of this invention is to provide a method and apparatus for loading and unloading a vehicle for transport.

A further object of this invention is to provide a transport apparatus in which the weight of a vehicle to be loaded on the transport apparatus is employed to cause a pivotally mounted loading ramp to move from its loading and unloading position to its transport position and vice versa with the ramp remaining in the position to which it is moved until the vehicle is shifted from one of its positions towards the other position.

Still another object of this invention is to provide a self-loading transport apparatus in which no hydraulic system is required to move a loading and unloading ramp.

The attached drawings illustrate a preferred embodiment of the invention, in which:

FIG. 3 is a top plan view of an upper frame of the transport apparatus with its load support plate substantially removed for clarity purposes and without the links;

FIG. 4 is a top plan view of a lower frame of the transport apparatus of FIG. 1 and without the links;

Figure 1:
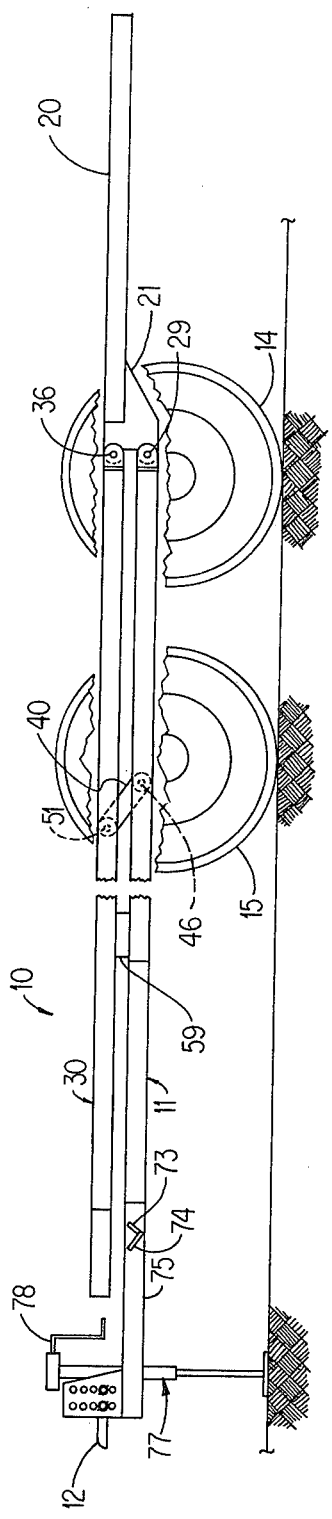
FIG. 1 is a side elevational view of the transport apparatus of the present invention in its transport or travel position.
Figure 15:
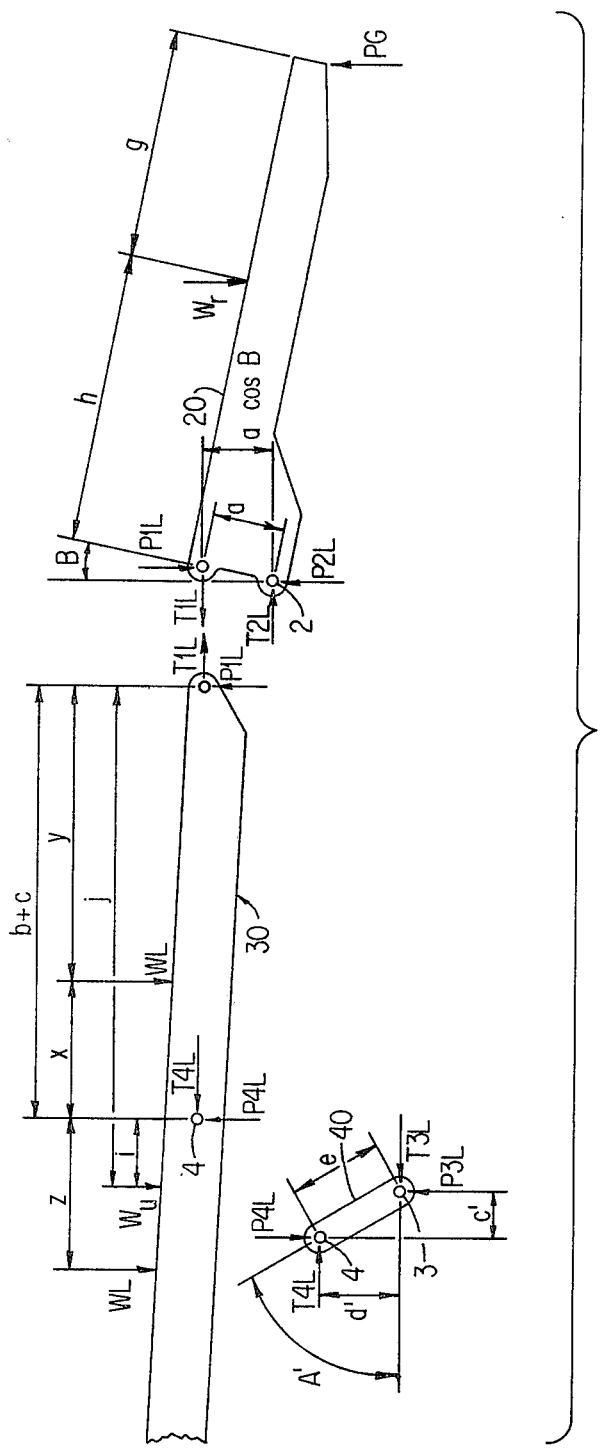
Figure 16:
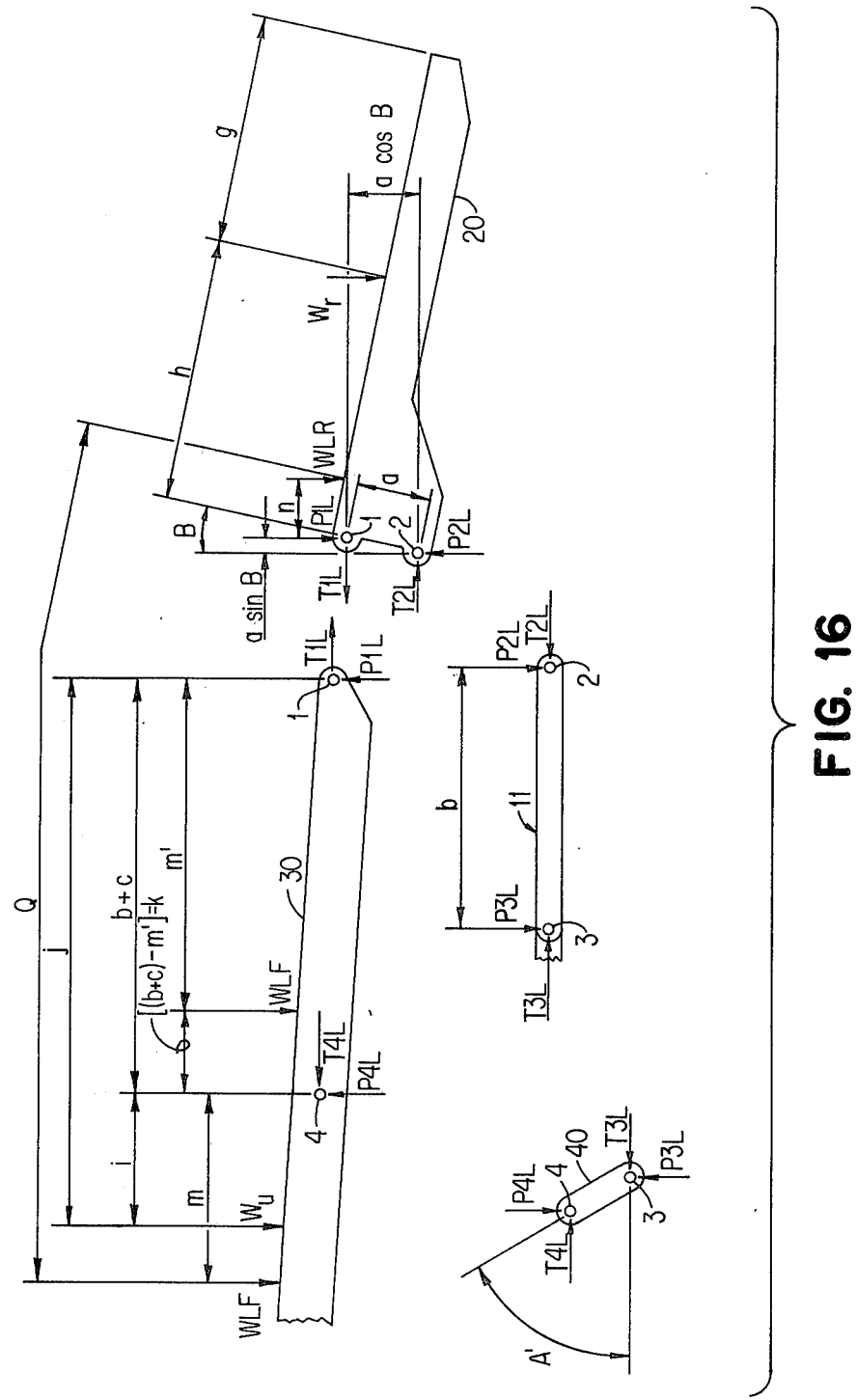

FIG. 15 is a schematic view of various elements of the transport apparatus of FIG. 1 with each element being in the loading and unloading position of the transport apparatus with a wheel load on the upper frame and showing the relationships of various distances and forces; and FIG. 16 is a schematic view of various elements of the transport apparatus of FIG. 1 with each element being in the loading and unloading position of the transport apparatus with a wheel load on each of the upper frame and the ramp and showing the relationships of various distances and forces.

Figure 2:
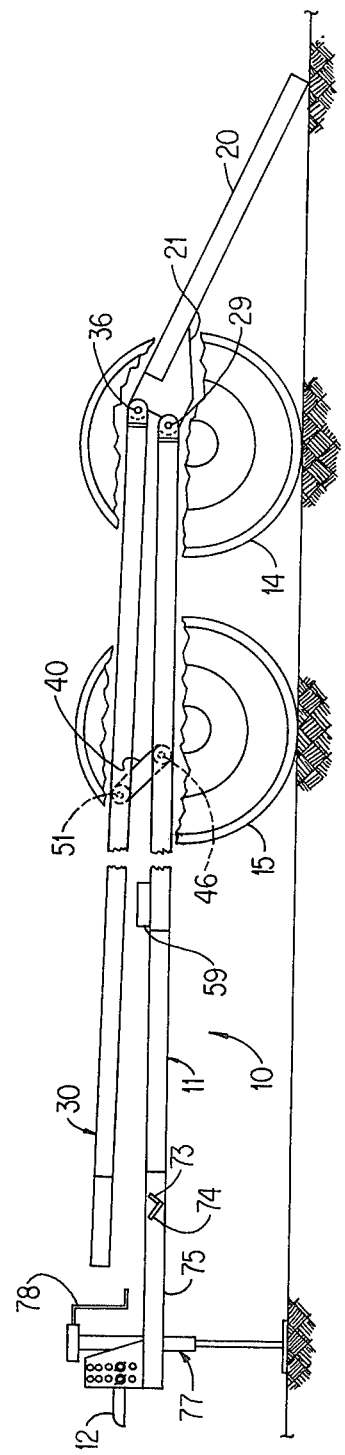
FIG. 2 is a side elevational view, similar to FIG. 1, of the transport apparatus but showing the transport apparatus in its loading and unloading position.

Referring to the drawings and particularly FIGS. 1 and 2, there is shown a transport apparatus 10 having a lower frame 11 for attachment to a vehicle (not shown) for towing the transport apparatus 10. The lower frame 11 has attaching means 12 at its forward end for attachment to the vehicle, which is to tow the transport apparatus 10. The attaching means 12 may be a clevis, a gooseneck, or a ball, for example, for attaching the transport apparatus 10 to the vehicle for towing the transport apparatus 10.

The lower frame 11 is supported adjacent its rear end by a first set of wheels 14 and a second set of wheels 15. Thus, the wheels 14 and 15 support the lower frame 11 of the transport apparatus 10 for transport along the ground by any suitable means.

Figure 8:
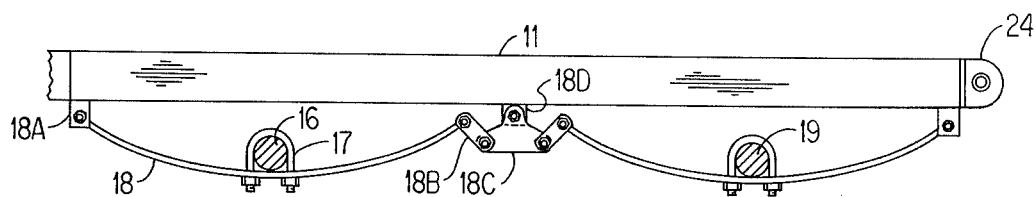
FIG. 8 is a side elevational view of a portion of the lower frame of the transport apparatus and showing the mounting arrangement for the wheels.

The wheels 15 are mounted on an axle 16 (see FIG. 8), which is supported from the lower frame 11 by U-bolts 17 connected to springs 18. Each of the springs 18 has one end connected to a mounting bracket 18A and its other end connected to a link 18B. The link 18B is pivotally connected to an equalizer 18C, which is supported from the lower frame 11 by a mounting bracket 18D. The wheels 14 (see FIGS. 1 and 2) are mounted on an axle 19 (see FIG. 8), which is supported in the same manner as the axle 16.

Figure 5:
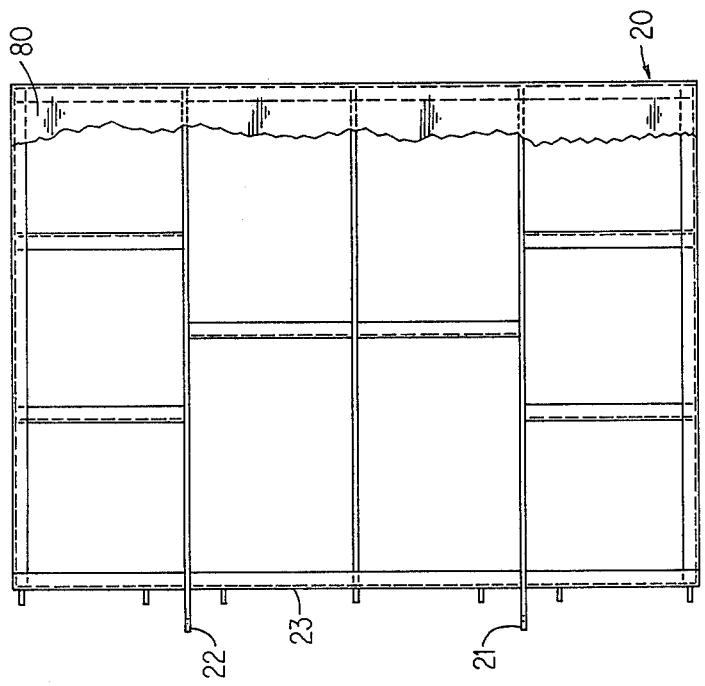
FIG. 5 is a top plan view of a ramp of the transport apparatus of the present invention with its load support plate substantially removed for clarity purposes.

A ramp 20 (see FIGS. 1 and 2) is pivotally connected at the rear end of the lower frame 11. The ramp 20 has a pair of longitudinally extending plates 21 (see FIG. 5) and 22 extending forwardly of a front U-shaped channel 23, which is formed of a central segment and two outer segments.

The plate 21 fits between a pair of brackets 24 (see FIG. 4) and 25, which are secured to the rear of a rear channel 26 of the lower frame 11. The plate 22 (see FIG. 5) extends between a pair of brackets 27 (see FIG. 4) and 28, which also are secured to the rear channel 26 of the lower frame 11.

A pivot pin 29 (see FIGS. 1 and 2) extends through a bushing in aligned openings in the plate 21 (see FIG. 5) and the brackets 24 (see FIG. 4) and 25 to form one of the two pivotal connections of the ramp 20 to the lower frame 11. A pivot pin (not shown) extends through a bushing in aligned openings in the plate 22 (see FIG. 5) and the brackets 27 (see FIG. 4) and 28 to also pivotally connect the ramp 20 to the lower frame 11.

Thus, the two pivotal connections of the ramp 20 to the lower frame 11 form pivotal connecting means therebetween. The pivot pins (one shown at 29) are horizontally aligned with each other so that the ramp 20 pivots about a horizontal axis when pivoting between the transport or travel position of FIG. 1 and the loading and unloading position of FIG. 2.

The ramp 20 also is pivotally connected to the rear end of an upper frame 30. In addition to the plate 21 (see FIG. 5) having a portion disposed between the brackets 24 (see FIG. 4) and 25 of the lower frame 11, the plate 21 (see FIG. 5) also has a portion disposed between a pair of brackets 31 (see FIG. 3) and 32, which are secured to a rear U-shaped channel 33 of the upper frame 30. Likewise, the plate 22 (see FIG. 5), which has a portion disposed between the brackets 27 (see FIG. 4) and 28 of the lower frame 11, also has a portion disposed between a pair of brackets 34 (see FIG. 3) and 35, which are secured to the rear channel 33.

A pivot pin 36 (see FIGS. 1 and 2) extends through a bushing in aligned openings in the plate 21 (see FIG. 5) and the brackets 31 (see FIG. 3) and 32. A similar pivot pin (not shown) extends through a bushing in aligned openings in the plate 22 (see FIG. 5) and the brackets 34 (see FIG. 3) and 35. Thus, the two pivot pins (one shown at 36) define a horizontal axis about which the ramp 20 pivots with respect to the upper frame 30.

As shown in FIG. 1, the two pivot axes for the ramp 20 are vertically aligned with each other when the transport apparatus 10 is in the transport position. While these two horizontal pivot axes of the ramp 20 are preferably vertically aligned with each other as shown in FIG. 1, it should be understood that such is not a requisite for satisfactory operation. The upper frame horizontal pivot axis, defined by the pivot pin 36, could be forward of the lower frame horizontal pivot axis, defined by the pivot pin 29, when the transport apparatus 10 is in the transport position. However, it is necessary for the upper frame horizontal pivot axis, defined by the pivot pin 36, to be rearward of the lower frame horizontal pivot axis, defined by the pivot pin 29, when the ramp 20 engages the ground as shown in FIG. 2 in order for the ramp 20 to remain in this position.

Figure 6:
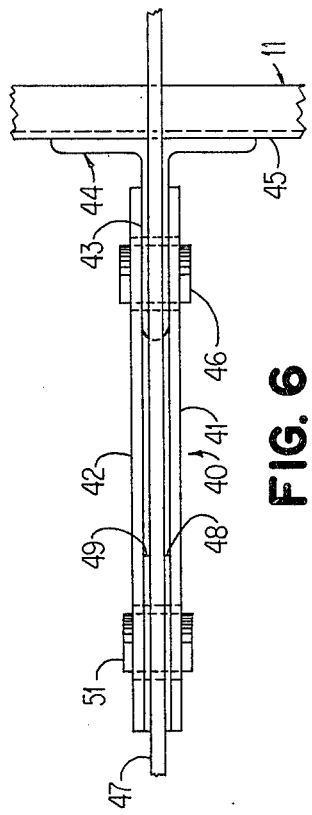
FIG. 6 is a fragmentary top plan view of a link connecting the upper and lower frames of the transport apparatus to each other.
Figure 7:
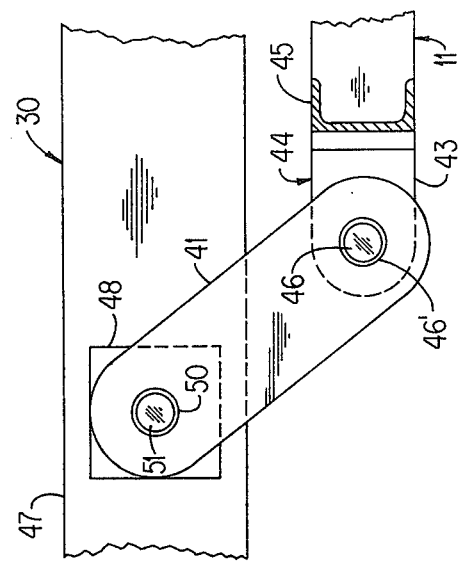
FIG. 7 is a fragmentary elevational view, partly in section, showing the connection of an arm of one of the links to both the upper and lower frames of the transport apparatus.

The lower frame 11 and the upper frame 30 are connected to each other intermediate their ends by a pair of links (one shown at 40 in FIGS. 1 and 2). The link 40 includes a pair of arms 41 (see FIG. 6) and 42 disposed on opposite sides of a tongue 43 of a bracket 44, which is secured to a U-shaped channel 45 of the lower frame 11. A pivot pin 46 extends through a bushing 46' (see FIG. 7) in aligned openings in the arms 41 and 42 (see FIG. 6) and the tongue 43 to pivotally connect the lower end of the link 40 to the lower frame 11.

The arms 41 and 42 of the link 40 are disposed on opposite sides of a longitudinally extending plate 47 of the upper frame 30. The plate 47 has square-shaped shims 48 and 49 on opposite sides thereof with the shim 48 bearing against the inner surface of the arm 41 of the link 40 and the shim 49 bearing against the inner surface of the arm 42 of the link 40. The shims 48 and 49 and the plate 47 have aligned openings within which is disposed a bushing 50 (see FIG. 7). A pivot pin 51 extends through the bushing 50 to pivotally connect the upper end of the link 40 to the upper frame 30.

The lower frame 11 (see FIG. 4) has a second bracket 52, which is secured to the channel 45, with a tongue 53 projecting therefrom for disposition between a pair of arms (not shown), which are the same as the arms 41 (see FIG. 6) and 42, of the other of the links (not shown) in the same manner as the tongue 43 extends between the arms 41 and 42. The lower end of the link (not shown) is pivotally connected to the tongue 53 of the bracket 52 by a pivot pin (not shown) in the same manner as the pivot pin 46 connects the lower end of the link 40 to the tongue 43 of the bracket 44.

The upper frame 30 has a longitudinally extending plate 55 (see FIG. 3), which is substantially parallel to the plate 47. The plate 55 has shims 56 and 57 on opposite sides thereof in the same manner as the shims 48 and 49 are disposed on opposite sides of the plate 47. A bushing (not shown) is disposed within aligned openings in the shims 56 and 57 and the plate 55 to receive a pivot pin to pivotally connect the upper end of the link, which has its lower end pivotally connected to the lower frame 11 (see FIG. 4) at the bracket 52, to the upper frame 30 (see FIG. 3).

The pivot axis for connection of the two links (one shown at 40 in FIG. 1) to the upper frame 30 is on the same horizontal axis, which is defined by the pivot pin 51. Similarly, the pivot axis for connection of the two links (one shown at 40) to the lower frame 11 is on the same horizontal axis, which is defined by the pivot pin 46.

Additionally, as shown in FIG. 3, the plate 47 is aligned with the space between the brackets 31 and 32 of the upper frame 30 within which the plate 21 (see FIG. 5) of the ramp 20 is disposed for pivotal connection thereto. The plate 55 (see FIG. 3) is aligned with the space between the brackets 34 and 35 of the upper frame 30 within which the plate 22 (see FIG. 5) of the ramp 20 is disposed for pivotal connection thereto.

As shown in FIG. 4, the tongue 43 of the bracket 44 is aligned with the space between the brackets 24 and 25 of the lower frame 11 within which the plate 21 (see FIG. 5) of the ramp 20 is disposed for pivotal connection thereto. Similarly, the tongue 53 of the bracket 52 is aligned with the space between the brackets 27 and 28 of the lower frame 11 within which the plate 22 (see FIG. 5) of the ramp 20 is disposed for pivotal connection thereto.

Thus, one element of each of one of the pivotal connections between the ramp 20 and the lower frame 11, the ramp 20 and the upper frame 30, and the link 40 to each of the upper frame 30 and the lower frame 11 is in the same plane. One element of each of the other pivotal connections between the lower frame 11 and the ramp 20, the ramp 20 and the upper frame 30, and the other link (not shown) to each of the lower frame 11 and the upper frame 30 is in the same plane and parallel to the first plane.

Figure 9:
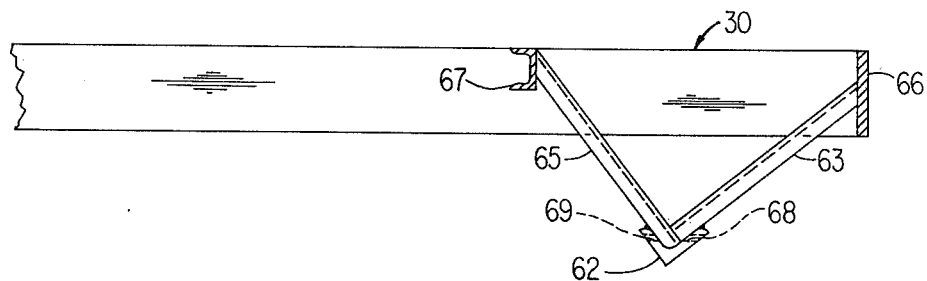
FIG. 9 is a fragmentary side elevational view, partly in section, of a portion of the upper frame of the transport apparatus taken along line 9—9 of FIG. 3 and showing a portion of latch means for holding the upper frame to the lower frame when the transport apparatus is in its transport or travel position.
Figure 10:
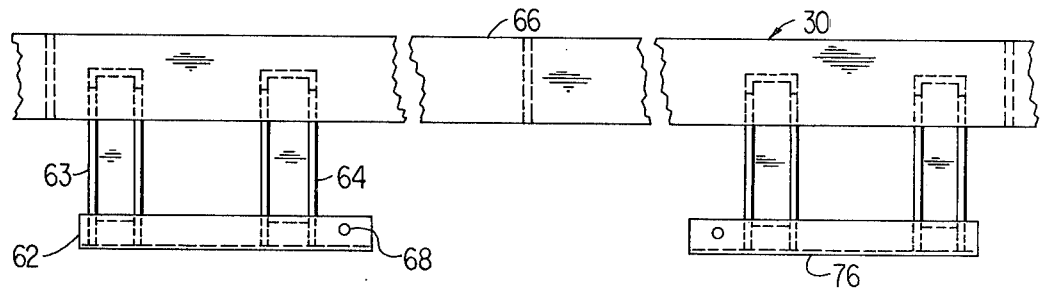
FIG. 10 is a fragmentary front elevational view of a portion of the upper frame of the transport apparatus and showing a portion of the latch means for securing the upper frame to the lower frame when the transport apparatus is in its transport or travel position.
Figure 12:
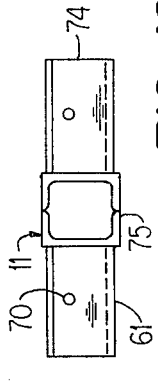
FIG. 12 is a front elevational view of a portion of the lower frame of the transport apparatus and showing a portion of the latch means of FIG. 11 for securing the upper frame to the lower frame.
Figure 11:
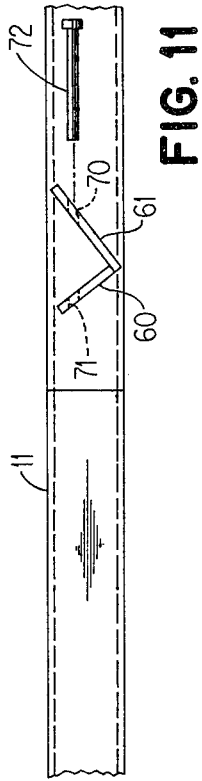
FIG. 11 is a fragmentary side elevational view of a portion of the lower frame of the transport apparatus and showing other portions of the latch means for securing the upper frame to the lower frame when the transport apparatus is in its transport position.

When the upper frame 30 rests on the lower frame 11 in the transport or travel position of the transport apparatus 10 as shown in FIG. 1 with the upper frame 30 engaging stops 59 on the lower frame 11, the upper frame 30 is latched to the lower frame 11. The lower frame 11 has a first pair of plates 60 (see FIG. 11) and 61 disposed substantially perpendicular to each other to form a recess to receive an L-shaped bracket 62 (see FIGS. 9 and 10), which is secured to the upper frame 30 by a pair of forwardly extending U-shaped channels 63 and 64 and a pair of rearwardly extending U-shaped channels 65 and 65' (see FIG. 3).

The forwardly extending channel 63 (see FIGS. 9 and 10) is secured to the rearwardly extending channel 65 by the bracket 62. The upper end of the forwardly extending channel 63 is secured to a front plate 66 of the upper frame 30. The upper end of the rearwardly extending channel 65 is secured to a channel 67 of the upper frame 30.

The forwardly extending channel 64 also is secured to the bracket 62 as is the other rearwardly extending channel 65' (see FIG. 3). The upper end of the forwardly extending channel 64 is secured to the front plate 66, and the upper end of the rearwardly extending channel 65' is secured to the channel 67 of the upper frame 30 in the same manner as the rearwardly extending channel 65.

The L-shaped bracket 62 has aligned openings 68 and 69 for alignment with an opening 70 (see FIG. 11) in the plate 61 and an opening 71 in the plate 60. A bolt or pin 72 extends through the aligned openings 68–71 to latch the upper frame 30 to the lower frame 11 when the transport apparatus 10 is in the transport or travel position.

The lower frame 11 has a second pair of plates 73 (see FIG. 4) and 74 disposed on the opposite side of its main beam 75 from the plates 60 and 61 for receiving an L-shaped bracket 76 (see FIG. 10), which is mounted in the same manner as the L-shaped bracket 62. Accordingly, this forms a second latch for retaining the upper frame 30 on the lower frame 11.

The lower frame 11 has a jack 77 secured to the main beam 75. Thus, turning of a handle 78 to position the jack 77 enables disposition of the lower frame 11 in a horizontal position.

The upper frame 30 has a support plate 79 (see FIG. 3) on which a vehicle, which is to be carried by the transport apparatus 10, can be supported. Only a part of the plate 79 is shown in FIG. 3 for clarity purposes.

The ramp 20 has a support plate 80 (see FIG. 5) for supporting the vehicle to be carried by the transport apparatus 10 during loading and unloading. Only a portion of the plate 80 is shown for clarity purposes.

The transport apparatus 10 must be capable of moving from its transport or travel position of FIG. 1 to its loading and unloading position of FIG. 2 and vice versa by either the weight of the equipment such as a vehicle, for example, being loaded or unloaded or a force applied by the operator to the ramp 20 when there is no load on the transport apparatus 10. Accordingly, it is necessary that there be certain relations between various parts of the transport apparatus 10. These relations should produce the following six properties:

1. The transport apparatus 10 will remain in its transport or travel position under its own weight alone after being placed there.

2. The transport apparatus 10 will remain in the loading and unloading position under its own weight alone after being placed there.
3. With the transport apparatus 10 stable in the loading and unloading position under its own weight, the transport apparatus 10 will move to its transport or travel position when a load reaches a certain point on the upper frame 30.
4. When the transport apparatus 10 is stable in the loading and unloading position under its own weight, the transport apparatus 10 will move to its transport or travel position when two discrete loads reach certain points on the transport apparatus 10.
5. When the transport apparatus 10 is in the transport or travel position, it will be held in this position when the load on the transport apparatus 10 is forward of a certain point.
6. When the transport apparatus 10 is stable in the transport or travel position under its own weight and a single load or two discrete loads, the transport apparatus 10 will move to its loading and unloading position when either the single load or the two discrete loads are moved backwards to a specific point.

Figure 13:
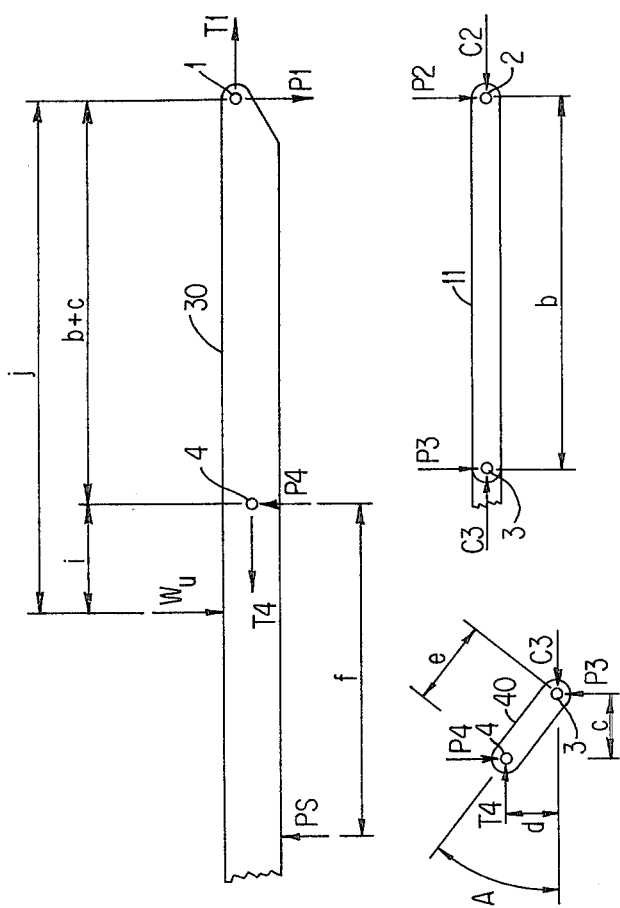
FIG. 13 is a schematic view of various elements of the transport apparatus of FIG. 1 with each element being in the transport or travel position of the transport apparatus and showing the relationships of various distances and forces.

Referring to FIG. 13 in which the lower frame 11, the ramp 20, the upper frame 30, and the link 40 are separated from each other in the transport position without any load thereon, the axis of the pivotal connection between the ramp 20 and the upper frame 30 is point 1, the axis of the pivotal connection between the ramp 20 and the lower frame 11 is point 2, the axis of the pivotal connection between the links (one shown at 40) and the lower frame 11 is point 3, and the axis of the pivotal connection between the links (one shown at 40) and the upper frame 30 is point 4.

Each of these pivot points 1–4 is subjected to horizontal forces (identified as T1 at the point 1 and C2 at the point 2, for example). Each of the pivot points 1–4 is subjected to vertical forces (identified by P1 for the vertical force at the point 1, for example).

As shown in FIG. 13, a is the vertical distance between the points 1 and 2, b is the horizontal distance between the points 2 and 3, c is the horizontal distance between the points 3 and 4, d is the vertical distance between the points 3 and 4, e is the distance between the points 3 and 4 along the link 40, f is the horizontal distance from the point 4 to a point at which the upper frame 30 is supported by the lower frame 11, g is the distance along the ramp 20 of the center of gravity of the weight, $W_r$, of the ramp 20 from the end of the ramp 20, h is the distance along the ramp 20 of the center of gravity of $W_r$ from the point 1, and the horizontal distances of the center of gravity of the weight, $W_u$, of the upper frame 30 from the points 4 and 1 are i and j, respectively. The angle of the link 40 to the horizontal is A.

With the ramp 20 in static equilibrium, summing moments about the point 2 results in $$T1(a) = W_r(h). \tag{1}$$

Solving equation (1) for T1 produces $$T1 = W_r(h)/a. \tag{2}$$

With the link 40 in static equilibrium, summing moments about the point 3 produces $$T4(d) = P4(c). \tag{3}$$

Since $$d = (c) \tan A, \tag{4}$$

substituting the relation of equation (4) in equation (3) and solving for T4 produces $$T4 = P4/\tan A. \tag{5}$$

With the upper frame 30 in static equilibrium, summing moments about the point 1 produces $$P4(b+c) + T4(a-d) = W_u(j). \tag{6}$$

However, since a−d is nearly zero, T4(a−d) can be ignored whereby equation (6) becomes $$P4 = \frac{W_u(j)}{(b+c)}. \tag{7}$$

Substituting in equation (7) for P4 in terms of T4 defined in equation (5), equation (7) becomes $$T4 = \frac{W_u(j)}{(b+c)\tan A}. \tag{8}$$

When the upper frame 30 is in static equilibrium, T1=T4. However, if T1 is greater than T4, then the ramp 20 rotates from the transport or travel position of FIG. 1 to the loading and unloading position of FIG. 2, and the upper frame 30 follows. If T4 is greater than T1, then the ramp 20 tends to move in the opposite direction, but the transport or travel position is defined as the limit of movement in this opposite direction.

Therefore, when T4 is greater than T1, the upper frame 30 engages the lower frame 11 with a force PS at the stops 59. When the upper frame 30 engages the lower frame 11, T4 and T1 become equal through P4 being reduced. When T4 and T1 become equal and defining T4 in terms of P4 through equation (5) and T1 in terms of equation (2), then $$\frac{P4}{\tan A} = \frac{W_r(h)}{a}. \tag{9}$$

Solving equation (9) for P4 results in $$P4 = \frac{W_r(h)\tan A}{a}. \tag{10}$$

By summing moments about the point 1 for the upper frame 30 with the upper frame 30 engaging the lower frame 11, $$W_u(j) = P4(b+c) + PS(f+b+c) \tag{11}$$

where T4(a-d) is ignored because of the small size. Therefore, solving equation (11) for PS while using equation (10) to define P4 results in $$PS = \frac{W_u(j) - W_r(h)(\tan A)[(b+c)/a]}{(f+b+c)} \quad (12)$$

Thus, from equation (12), the force PS required to be exerted on the upper frame 30 by the lower frame 11 is obtained.

Accordingly, T4 must be greater than T1 when the transport apparatus 10 is in the transport or travel position to maintain the transport apparatus 10 in this position. At this time, PS comes into play so that the transport apparatus 10 remains in equilibrium because of its weight in accordance with the first of the six properties.

The upper frame 30 must be first designed to have the necessary strength and dimensions to support the load to be carried. Then, the ramp 20 is designed for the same considerations and to have sufficient length so that its slope in the loading and unloading position is gentle enough for safe loading and unloading.

With both the weight and the location of the center of gravity of each of the upper frame 30 and the ramp 20 being determined, then a, b, c, and A must be selected for the transport apparatus 10 to have the required six properties.

As one example, $W_u = 1034$ pounds, $j = 6.25'$, $W_r = 434$ pounds, $h = 2.275'$, and $g = 2.225'$. When a is selected to be 6.75" (0.5625'), b to be 3.3333', d to be 5.25", and A to be 38°, then from equation (4) $c = d/\tan A = 6.71'' = 0.560'$. Therefore, $b+c = 3.3333' + 0.560' = 3.8933'$. From equation (2) in which the ramp 20 is in static equilibrium, $T1 = W_r(h)/a = 434(2.275/0.5625) = 1755$ pounds.

From equation (8) in which the upper frame 30 is in static equilibrium, $$T4 = \frac{W_u(j)}{(b+c)\tan A} = \frac{1034(6.25)}{3.8933 \tan 38°} = 2125 \text{ pounds.}$$

Thus, T4 is greater than T1 so that the transport apparatus 10 will remain in the transport or travel position with the selected dimensions of a, b, c, and A.

A force F applied manually by the operator to the end of the ramp 20 to move the ramp 20 from the transport or travel position to the loading and unloading position is defined by summing moments about the point 2 so that $$F(h+g) + W_r(h) = T1(a). \quad (13)$$

In order for the ramp 20 to be moved from its transport or travel position to its loading and unloading position by the application of the force F at the end of the ramp 20, the magnitude of T4 must be overcome. That is, T1 must be equal to T4 or greater than T4. Therefore, to accomplish this movement of the ramp 20 by the application of the force F, T1 must equal T4 so that T1 becomes 2125 pounds. Thus, from equation (13), $$F = \frac{(2125)(.5625) - 434(2.275)}{4.5} = 46 \text{ pounds.}$$

Accordingly, when the ramp 20 is in the travel or transport position, the application of a downward force of 46 pounds at the end of the ramp 20 moves the ramp 20 from the transport or travel position to the loading and unloading position. Therefore, the operator can manually apply this small force at the end of the ramp 20 to easily move the ramp 20 to its loading and unloading position from its transport position.

When the transport apparatus 10 has moved to its loading and unloading position, the ramp 20 rotates about the point 2 by an angle B (See FIG. 14 in which the lower frame 11, the ramp 20, the upper frame 30, and the like 40 are separated from each other.) until the end of the ramp 20 contacts the ground. It should be understood that the angle B is selected to be a small value for easy loading although it can be any angle.

When the ramp 20 has rotated the angle B about the point 2, the points 1 and 4 have moved backwards the horizontal distance of a sin B. As a result, the angle A becomes A' where $$A' = \cos^{-1}\left(\frac{c - a \sin B}{e}\right).$$

Additionally, d becomes d' where $d' = e \sin A'$. The point 1 also has moved downward a vertical distance of $a(1 - \cos B)$.

Therefore, the upper frame 30 stands at an angle C (see FIG. 14) from the horizontal where $$C = \sin^{-1}\left[\frac{d' - d + a(1 - \cos B)}{b+c}\right].$$

The angle C is small enough that any change in the horizontal distances j, i, and b+c due to it can be ignored.

Figure 14:
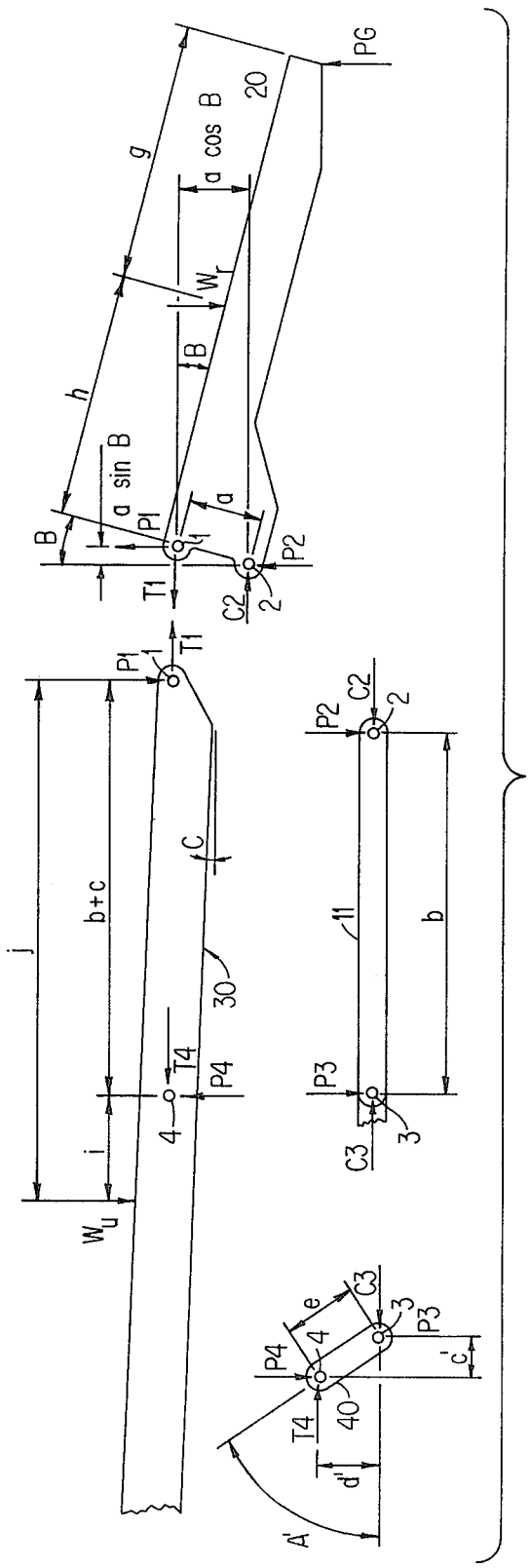
FIG. 14 is a schematic view of the same elements of the transport apparatus of FIG. 1 as shown in FIG. 13 with each element being in the loading and unloading position of the transport apparatus and showing the relationships of various distances and forces.

Summing moments about the point 2 for static equilibrium of the ramp 20 in the loading and unloading position as shown in FIG. 14 with the ramp 20 ready to cease to engage the ground due to T4 being larger than T1 so that PG = 0, $$T1(a\cos B) = W_r(h \cos B + a \sin B) - P1(a \sin B). \quad (14)$$

Solving equation (14) for T1 produces $$T1 = W_r(h/a + \tan B) - P1 \tan B. \quad (15)$$

Summing moments about the point 4 for static equilibrium of the upper frame 30 when the transport apparatus 10 is in the loading and unloading position of FIG. 14 produces $$W_u(i) = P1(b+c) + T1(a \cos B - d'). \quad (16)$$

However, $a \cos B - d'$ is very small so that $T1(a \cos B - d')$ can be ignored. Accordingly, equation (16) becomes $$P1 = \frac{W_u(i)}{b+c}. \quad (17)$$

Therefore, substituting for P1 from equation (17), equation (15) becomes $$T1 = W_r(h/a + \tan B) - \frac{W_u(i)(\tan B)}{b+c}. \quad (18)$$

For static equilibrium of the link 40 when the transport apparatus 10 is in its loading and unloading position, summing moments about the point 3 results in $$T4(d') = P4(c'). \tag{19}$$

Accordingly, solving equation (19) for T4 produces $$T4 = P4(c'/d). \tag{20}$$

However, from FIG. 14, $$\tan A' = d'/c' \tag{21}$$

so that equation (19) becomes $$T4 = P4/\tan A'. \tag{22}$$

With the upper frame 30 in static equilibrium, summing moments about the point 1 produces $$P4(b+c) + T4(a \cos B - d') = W_u(j). \tag{23}$$

As previously mentioned, $a \cos B - d'$ is very small so that the T4 term in equation (23) can be ignored. Accordingly, equation (23) becomes $$P4 = W_u(j)/b + c. \tag{24}$$

Substituting T4 for P4 according to equation (22) in equation (24) results in $$T4 = \frac{W_u(j)}{(b+c) \tan A'}. \tag{25}$$

For static equilibrium, T1 must equal T4. However, if T4 is greater than T1, the transport apparatus 10 is not in static equilibrium and the point 4 moves forward so that the transport apparatus 10 moves from its loading and unloading position to its transport position. If T1 is greater than T4, the transport apparatus 10 tends to move in the other direction but this is limited by contact of the ramp 20 with the ground.

Accordingly, the ground exerts an upward force, PG, on the end of the ramp 20. The upward force, PG, produces static equilibrium in the loading and unloading position. With the ramp 20 in static equilibrium in the loading and unloading position, summing moments about the point 2 produces $$P1(a \sin B) + T1(a \cos B) + PG[(h+g)(\cos B) + a \sin B] = W_r[h \cos B + a \sin B]. \tag{26}$$

For static equilibrium, T1 and T4 must be equal with the smaller of T1 and T4 being the magnitude to which T1 and T4 are equal. When the ramp 20 is in the loading and unloading position, T4 is the smaller force so that $T1 = T4 = W_u(j)/(b+c) \tan A'$ from equation (25). From equation (17), $P1 = W_u(i)/b + c$. Thus, substituting in equation (26) for T1 from equation (25) and for P1 from equation (17) results in $$PG = \frac{W_r[h \cos B + a \sin B] - \frac{W_u[(j) \ (a \cos B)]}{[(b+c) \tan A']} - \frac{W_u(i) \ (a \sin B)}{(b+c)}}{[(h+g) (\cos B) + a \sin B]}. \tag{27}$$

Accordingly, when the transport apparatus 10 is in the loading and unloading position of FIG. 14, it is necessary for T1 to be greater than T4 for the transport apparatus to remain in this position.

Thus, the key to obtaining simultaneous existence of the first and second properties is the increase of A to A' because tangent A' must become sufficiently larger than tangent A so that the separately calculated T1 and T4 reverse roles as to which is the larger with T1 being larger in the loading and unloading position and T4 being larger in the transport position.

Using the distances already given and selecting $B = 21°$ so that $\tan B = 0.3838$, $\cos B = 0.9336$, $h \cos B = 2.123$. With $a = 0.5625'$, $a \cos B = 0.5251$ and $a \sin B = 0.2016$.

From FIG. 14, $$A' = \cos^{-1}[(c - a \sin B)/(e)]. \tag{28}$$

From FIG. 13, $e = d/\sin A = d/\sin 38° = 5.25''/0.615 = 8.52'' = 0.7106'$. Substituting in equation (28) produces $A' = \cos^{-1}[(0.560 - 0.2016)/(0.7106)] = 59.8°$. Accordingly, $\tan A' = 1.718$.

From FIG. 13, $i = j - (b+c) = 6.25' - 3.8933' = 2.3567'$. Substituting in equation (18), $T1 = 434 \ (2.275/0.5625 + 0.3838) - 1034 \ (2.3567/3.8933)(0.3838) = 1921 - 240 = 1681$ pounds.

From equation (25), $T4 = 1034 \ (6.25)/3.8933 \ (1.718) = 966$ pounds. Thus, T4 is less than T1.

Accordingly, by selecting $B = 21°$ with $h + g = 4.5'$, T1 is greater than T4 in the loading and unloading position. Thus, pivotal movement of 21° by the ramp 20 about the point 2 insures that the ramp 20 remains in its loading and unloading position after being disposed there since T1 is greater than T4.

From the foregoing relationships and using equation (27), $$PG = \frac{434/[2.123 + .2016] - 966(.5251) - 1034 \frac{(2.3567) \ (.2016)}{3.8933}}{4.5 \ (.9336) + .2016} = 85 \text{ pounds}.$$

Accordingly, to manually lift the transport apparatus 10 from its loading and unloading position to its transport position, an upward force exerted on the end of the ramp 20 needs to be only greater than 85 pounds. This can be easily accomplished by a single person.

Referring to FIG. 15, there is shown a single wheel load WL acting at a distance of y from the point 1 and a distance of x from the point 4 although it should be understood that WL can also be disposed at any distance z forward of the point 4. All of the forces due to the self weight of the transport apparatus 10 are still acting. However, all of the P and T forces in FIG. 15 will be identified with the additional suffix of letter L so that P4 of FIG. 14, for example, becomes P4L. The C forces will be identified as T forces with the suffix of letter L so that C2 of FIG. 14 becomes T2L, for example.

Summing moments about the point 1 with the upper frame 30 in static equilibrium and the weight of the wheel load, WL, at the distance of y from the point 1 and the distance of x from the point 4, $$P4L(b+c) = W_u(j) + WL(y) \tag{29}$$

where the moment of T4L ($a \cos B - d'$) is ignored because of the short vertical distance between the points 1 and 4. Solving equation (29) for P4L produces $$P4L = W_u(j) + WL(y)/b+c. \tag{30}$$

Summing moments about the point 2 with the ramp 20 in static equilibrium at the time that the ramp 20 is ready to cease to engage the ground due to T4L being larger than T1L so that PG=0, $$T1L(a \cos B) = P1L(a \sin B) + W_r(h \cos B + a \sin B). \tag{31}$$

Solving equation (31) for T1L results in $$T1L = P1L \tan B + W_r(h/a + \tan B). \tag{32}$$

From equation (30), an increase in the distance y due to WL moving forwardly along the upper frame 30 causes an increase in P4L. This produces a decrease in P1L since P1L+P4L=WL+$W_u$. Thus, from equation (32), T1L decreases because of the decrease in P1L.

With the link 40 in static equilibrium and summing moments about the point 3, $$T4L(d') = P4L(c'). \tag{33}$$

Because $\tan A' = d'/c'$, equation (33) can be changed to $$T4L = P4L/\tan A'. \tag{34}$$

Accordingly, equation (30) becomes $$T4L = W_u(j) + WL(y)/(b+c)(\tan A'). \tag{35}$$

From equation (35), it is seen that forward movement of WL along the upper frame 30 produces an increase in T4L.

With the upper frame 30 in static equilibrium and summing moments about the point 4, $$P1L(b+c) + W_u(i) = WL(x) \tag{36}$$

where T1L ($a \cos B - d'$) is ignored because of the small size of the vertical distance between the points 1 and 4. Solving equation (36) for P1L produces $$P1L = WL(x) - W_u(i)/b+c. \tag{37}$$

As long as T1L exceeds T4L, the transport apparatus 10 will remain in the loading and unloading position. However, when T4L exceeds T1L due to WL moving forward along the upper frame 30 from the point 1, the ramp 20 and the upper frame 30 pivot about the point 2 so that the upper frame 30 engages the lower frame 11 to be in the transport or travel position.

If the magnitude of WL is not large enough to move the transport apparatus 10 from its loading and unloading position when disposed between the points 1 and 4, then movement of the transport apparatus 10 from its loading and unloading position would not occur until WL has been advanced forward of the point 4 by a distance of z. The distance z may increase to the front of the upper frame 30.

Accordingly, the length of the upper frame 30 must be designed so that it has sufficient length forward of the point 4 to accommodate the minimum load to be carried. This illustrates the third property of the six properties previously mentioned.

With the previously selected distances and angles and a 2,000 pound load, disposition of WL at three feet from the point 1 whereby y=3' and x=0.8933' results in T4L=1034(6.25)+2000 (3)/(3.8933) tan 59.8°=1863 from equation (35). From equation (37), P1L=2,000(0.8933)−1034(2.3567)/3.8933=−167 pounds. From equation (32), T1L=−167 tan 21°+1922=1857 pounds.

Thus, T4L slightly exceeds T1L at 3' from the point 1 so that just prior to 3' from the point 1, the transport apparatus 10 will move from its loading and unloading position to its transport position.

Referring to FIG. 16, there is shown a front wheel load, WLF, applied from the front axle of a vehicle being loaded on the transport apparatus 10 and a rear load, WLR, applied from the rear axle of the vehicle being loaded. The loads WLF and WLR are separated by a wheelbase distance Q of the vehicle being loaded. The load WLF is deemed to be a distance m forward of the point 4 and the load WLR is deemed to be a distance n rearward of the point 1.

Static equilibrium of the transport apparatus 10 is satisfied by each of T1L and T4L being equal to the lesser of the two values of T1L and T4L with T1L calculated separately for static equilibrium of the ramp 20 and T4L calculated separately for static equilibrium of the upper frame 30 and the link 40.

For static equilibrium of the ramp 20 and summing moments about the point 2 where PG is ignored for the same reasons as discussed with respect to equation (31), $$T1L(a)\cos B = W_r[h \cos B + a \sin B] + P1L(a \sin B) + WLR(n + a \sin B). \tag{38}$$

For static equilibrium of the upper frame 30 and summing moments about the point 4, $$P1L(b+c) = -WLF(m) - W_u(i) \tag{39}$$

where T1L($a-d'$) is ignored because it is very small. Solving equation (39) for P1L produces $$P1L = -[WLF(m) + W_u(i)/b+c]. \tag{40}$$

Substituting for P1L in equation (38) from equation (40) and solving for T1L produces $$T1L = W_r(h/a + \tan B) = [WLF(m) + W_u(i)/b+c]\tan B + WLF (n/a \cos B + \tan B). \tag{41}$$

For static equilibrium of the upper frame 30 and summing moments about the point 1, $$P4L(b+c) = W_u(j) + WLF(b+c+m) \tag{42}$$

where T4L($a-d'$) is ignored because of being very small. From equation (34), T4L=P4L/tan A' so that substituting for P4L in equation (42) produces $$T4L = W_u(j) + WLF(b+c+m)/(b+c) \tan A'. \tag{43}$$

If m=1.75, then n=Q−(b+c+m)=6'−5.6433'=0.3567'. With WLF=WLR=2000 pounds, equation (41) results in $$T1L = 434\left(\frac{2.275}{.5625} + .3838\right) -$$

$$\frac{[2000\,(1.75) + 1034\,(2.3567)]\,.3838}{3.8933} +$$

$$2000\left[\frac{.3567}{.5625\,(.9336)} + .3838\right] =$$

$$1921 - 585 + 2126 = 3462 \text{ pounds}$$

From equation (43), T4L=1034 (6.25)+2000 (5.6433)/(3.8933) (1.718)=2653 pounds.

Thus, when WLF is 1.75' forward of the point 4, the transport apparatus 10 still remains in its loading and unloading position because T1L is greater than T4L.

If the transport apparatus 10 moves forwardly so that m=2', than n=0.1067'. Substituting in equation (41), $$T1L = 434\left[\frac{2.275}{.5625} + .3838\right] -$$

$$\left[\frac{2000\,(2) + 1034\,(2.3567)}{3.8933}\right].3838 +$$

$$2000\left[\frac{.1067}{(.5625)\,(.9336)} + .3838\right] =$$

$$1921 - 634 + 1174 = 2461 \text{ pounds}$$

From equation (43), T4L=1034(6.25)+2000(5.8933)/(3.8933)(1.718)=2728 pounds. Accordingly, T4L exceeds T1L when m=2'. Therefore, when m=2', T4L is greater than T1L so that the transport apparatus 10 is moved to its transport position from its loading and unloading position after the load WLF is more than 1.75' forward of the point 4 and less than 2' forward of the point 4.

If WLF was located between the points 1 and 4 so that it was rearward of the point 4 by a distance of k and forward of the point 1 by a distance of m', then summing the moments about the point 4 for static equilibrium of the upper frame 30 would result in $$P1L(b+c) = WLF(k) - W_u(i) \tag{44}$$

where T1L(a−d') is ignored because it is very small. Solving equation (44) for P1L produces $$P1L = WLF(k) - W_u(i)/b+c. \tag{45}$$

Summing of moments about the point 2 for static equilibrium of the ramp 20 produces the same equation as equation (38). Therefore, substituting in equation (38) for P1L from equation (45) and solving for T1L produces $$T1L = W_r\left(\frac{h}{a}\tan B\right) + \frac{[WLF(k) - W_u(i)]\tan B}{b+c} + WLR\left(\frac{n}{a\cos B} + \tan B\right). \tag{46}$$

For static equilibrium of the upper frame 30, summing moments about the point 1 produces $$P4L(b+c) = WLF(m') + W_u(j) \tag{47}$$

where T4L (a−d') is ignored because it is very small. From equation (34), T4L=P4L/tan A' so that substituting this relation in equation (47) and solving for T4L results in $$T4L = WLF(m') + W_u(j)/(b+c)\tan A'. \tag{48}$$

The numerical solution from the prior values given with the load WLF forward of the point 4 shows that the transport apparatus 10 will remain in its loading and unloading position. This is because it cannot move to the transport position, as previously shown, until after the load WLR has advanced beyond 1.75' and less than 2' for the distances and relations given.

While the present invention has shown and described the transport apparatus 10 as being a trailer towed by another vehicle, it should be understood that such is not necessary for satisfactory operation. Thus, the transport apparatus 10 could have its own drive means and would require front steering wheels.

An advantage of this invention is that no hydraulic actuators are required. Another advantage of this invention is that very little force is required to move between the transport position and the loading and unloading position when no load is supported on the transport apparatus. A further advantage of this invention is that a load is easily loaded and unloaded by movement of its weight along the transport apparatus.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A transport apparatus for loading and unloading a vehicle including:

a lower frame;

means to support said lower frame for transport along the ground;

a ramp;

first means pivotally connecting said ramp to said lower frame to enable said ramp to be movable between a loading and unloading position and a transport position;

an upper frame disposed above said lower frame;

second means pivotally connecting said ramp to said upper frame, said second pivotally connecting means having its pivotal connection to said upper frame rearward of the pivotal connection of said first pivotally connecting means to said lower frame when said ramp is in its loading and unloading position;

linkage means extending between said lower frame and said upper frame;

third means pivotally connecting said linkage means to said lower frame and forward of said first pivotally connecting means, said first pivotally connecting means and said third pivotally connecting means having a fixed distance therebetween;

fourth means pivotally connecting said linkage means to said upper frame;

said fourth pivotally connecting means, being forward of said third pivotally connecting means so that said linkage means is at an angle of less than 90° to said lower frame irrespective of the position of said ramp; and said upper frame engaging said lower frame to stop pivotal movement of said upper frame and said ramp when said upper frame and said ramp are moved to the transport position.

2. The transport apparatus according to claim 1 in which said fourth pivotally connecting means has its pivotal connection to said upper frame disposed relative to the pivotal connection of said second pivotally connecting means to said upper frame to have the force exerted in the horizontal direction on said upper frame at the pivotal connection of said second pivotally connecting means greater than the force exerted in the horizontal direction on said upper frame at the pivotal connection of said fourth pivotal connecting means at least when said ramp is in its loading and unloading position and there is no load on said ramp and said upper frame.

3. The transport apparatus according to claim 2 in which said fourth pivotal connecting means has its pivotal connection to said upper frame disposed relative to the pivotal connection of said second pivotally connecting means to said upper frame so that the force in the horizontal direction on said upper frame at the pivotal connection of said fourth pivotal connecting means is greater than the force in the horizontal direction at the pivotal connection of said second pivotally connecting means when said ramp is in its transport position irrespective of whether a load is being carried by said upper frame.

4. The transport apparatus according to claim 3 in which said second pivotally connecting means has its pivotal connection to said upper frame vertically aligned with the pivotal connection of said first pivotally connecting means to said lower frame when said ramp is in its transport position.

5. The transport apparatus according to claim 4 including means to hold said upper frame in engaging relation with said lower frame so that said upper frame and said ramp are retained in the transport position.

6. The transport apparatus according to claim 1 in which said second pivotally connecting means has its pivotal connection to said upper frame vertically aligned with the pivotal connection of said first pivotally connecting means to said lower frame when said ramp is in its transport position.

7. The transport apparatus according to claim 6 including means to hold said upper frame in engaging relation with said lower frame so that said upper frame and said ramp are retained in the transport position.

8. The transport apparatus according to claim 1 in which said first pivotally connecting means and said third pivotally connecting means are in substantially the same horizontal plane.

9. The transport apparatus according to claim 8 in which said second pivotally connecting means and said fourth pivotally connecting means are in substantially the same horizontal plane when said upper frame and said ramp are in the transport position.

10. The transport apparatus according to claim 1 in which said second pivotally connecting means and said fourth pivotally connecting means are in substantially the same horizontal plane when said upper frame and said ramp are in the transport position.

11. The transport apparatus according to claim 1 including means to hold said upper frame in engaging relation with said lower frame so that said upper frame and said ramp are retained in the transport position.

12. A method of forming a transport apparatus having a lower frame supported for transport, a loading ramp pivotally connected to the lower frame at a first pivot point for pivotal movement between a ground engaging position for loading and unloading a load and a transport position for transporting the load, an upper frame disposed above the lower frame and pivotally connected to the loading ramp at a second pivot point, linkage means pivotally connected to the lower frame at a third pivot point and pivotally connected to the upper frame at a fourth pivot point forward of the third pivot point including:
  determining the weight of the loading ramp and the horizontal moment distance of the center of gravity of the loading ramp from the second pivot point;
  determining the weight of the upper frame and the horizontal moment distance of the center of gravity of the upper frame from the second pivot point; and
  selecting the vertical distance between the first pivot point and the second pivot point, the horizontal distance between the first pivot point and the third pivot point, the distance along the linkage means between the third pivot point and the fourth pivot point, and the horizontal distance between the third pivot point and the fourth pivot point so that the horizontal force exerted at the second pivot point is greater than the horizontal force exerted at the fourth pivot point when the loading ramp is in its ground engaging position and there is no load on the ramp and the upper frame.

13. The method according to claim 12 including selecting the vertical distance between the first pivot point and the second pivot point, the horizontal distance between the first pivot point and the third pivot point, the distance along the linkage means between the third pivot point and the fourth pivot point, and the horizontal distance between the third pivot point and the fourth pivot point so that the horizontal force exerted at the fourth pivot point is greater than the horizontal force exerted at the second pivot point when the loading ramp is in its transport position irrespective of whether the upper frame has a load thereon.

* * * * *

UNITED STATES PATENT OFFICE
CERTIFICATE OF CORRECTION

Patent No. 4,197,048        Dated April 8, 1980

Inventor(s) Roger Q. Brill

It is certified that error appears in the above-identified patent and that said Letters Patent are hereby corrected as shown below:

Column 10, line 7, "like" should read -- link --.

Column 11, line 23, cancel "P4=$W_u$(j)/b+c" and substitute $$-- P4 = \frac{W_u(j)}{b+c} --.$$

Column 12, line 20, cancel the "hyphen (-)"

Column 12, line 25, cancel "(2.275/0.5625+0.3838)" and substitute $$-- \left(\frac{2.275}{.5625} + 0.3838\right) --.$$

Column 12, line 42, "life" should read -- lift --.

Column 13, line 6, cancel "P4L=$W_u$(j)+WL(y)/b+c" and substitute $$-- P4L = \frac{W_u(j) + WL(y)}{b+c} --.$$

Column 13, line 35, cancel "T4L=$W_u$(j)+WL(y)/(b+c)(tan A')" and $$\text{substitute} -- T4L = \frac{W_u(j) + WL(y)}{(b+c)(\tan A')} --.$$

UNITED STATES PATENT OFFICE
CERTIFICATE OF CORRECTION

Patent No. 4,197,048　　　　Dated April 8, 1980

Inventor(s) Roger Q. Brill

It is certified that error appears in the above-identified patent and that said Letters Patent are hereby corrected as shown below:

Column 13, line 49, cancel "P1L=WL(x)-$W_u$(i)/b+c" and substitute $$P1L = \frac{WL(x) - W_u(i)}{b+c}$$

Column 14, line 47, cancel "P1L=-[WLF(m)+$W_u$(i)/b+c]" and substitute $$P1L = -\left[\frac{WLF(m) + W_u(i)}{b+c}\right]$$

Column 14, line 63, cancel "T4L=$W_u$(j)+WLF(b+c+m)/(b+c)tan A'" and substitute $$T4L = \frac{W_u(j) + WLF(b+c+m)}{(b+c)\tan A'}$$

Column 15, line 47, cancel "P1L=WLF(k)-$W_u$(i)/b+c" and substitute $$P1L = \frac{WLF(k) - W_u(i)}{b+c}$$

Column 16, line 4, cancel "T4L=WLF(m')+$W_u$(j)/(b+c) tan A'" and substitute $$T4L = \frac{WLF(m') + W_u(j)}{(b+c)\tan A'}$$

UNITED STATES PATENT OFFICE
CERTIFICATE OF CORRECTION

Patent No. 4,197,048     Dated April 8, 1980

Inventor(s) Roger Q. Brill

It is certified that error appears in the above-identified patent and that said Letters Patent are hereby corrected as shown below:

IN THE CLAIMS

Column 16, line 64, cancel the "comma (,)"

Signed and Sealed this

Twelfth Day of August 1980

[SEAL]

Attest:

SIDNEY A. DIAMOND

Attesting Officer     Commissioner of Patents and Trademarks